(12) United States Patent
Horley et al.

(10) Patent No.: US 7,638,572 B2
(45) Date of Patent: Dec. 29, 2009

(54) FIRE RETARDANT COATING COMPOSITION

(75) Inventors: Susan Mary Horley, Buckinghamshire (GB); Willow M. Worthington nee Hasted, Berkshire (GB)

(73) Assignee: Imperial Chemical Industries Limited, Portland House, Bresden Place (GB)

( * ) Notice: Subject to any disclaimer, the term of this patent is extended or adjusted under 35 U.S.C. 154(b) by 308 days.

(21) Appl. No.: 10/569,222

(22) PCT Filed: Jul. 30, 2004

(86) PCT No.: PCT/EP2004/008656

§ 371 (c)(1),
(2), (4) Date: Dec. 7, 2006

(87) PCT Pub. No.: WO2005/019356

PCT Pub. Date: Mar. 3, 2005

(65) Prior Publication Data

US 2007/0131916 A1    Jun. 14, 2007

(30) Foreign Application Priority Data

Aug. 22, 2003  (GB) ................................. 0319781.1
Oct. 23, 2003  (GB) ................................. 0324735.0

(51) Int. Cl.
  C08K 3/12  (2006.01)
  C08K 3/10  (2006.01)
(52) U.S. Cl. .................... 524/434; 523/205; 524/436; 524/437
(58) Field of Classification Search ............... 524/432, 524/436, 437, 36; 523/205
See application file for complete search history.

(56) References Cited

U.S. PATENT DOCUMENTS

| 5,496,881 | A | * | 3/1996 | Annemaier et al. | ......... 524/443 |
| 6,150,447 | A | * | 11/2000 | Cusack et al. | ............ 524/413 |
| 6,528,552 | B1 | * | 3/2003 | Ikeguchi et al. | ............ 522/81 |
| 7,078,452 | B2 | * | 7/2006 | Ebrahimian et al. | ......... 524/444 |
| 2004/0126574 | A1 | * | 7/2004 | Kawaguchi et al. | ......... 428/343 |

* cited by examiner

Primary Examiner—Peter Szekely
(74) Attorney, Agent, or Firm—George W. Moxon, II; Moxon & Spriegel

(57) ABSTRACT

A halogen-free fire retardant coating composition comprising film forming polymer, inorganic fire retardant material characterised in that the fire retardant material comprises a combination of fire retardant filler particles and a metal stannate and/or a metal hydroxy stannate wherein the overall PVC of the composition is from 75 to 97%.

17 Claims, No Drawings

FIRE RETARDANT COATING COMPOSITION

This application is a national stage filing of PCT International Application No. PCT/EP/2004/008656 filed Jul. 7, 2004, entitled "A FIRE RETARDANT COATING COMPOSITION" and now published with the International Publication No. WO 2005/019356. This application also claims the right of priority under 35 U.S.C. §119(a) to Great Britain Patent Applications No. 0319781.1, filed Aug. 22, 2003 and 0324735.0, filed Oct. 23, 2003. The disclosure of all of these applications is hereby incorporated in their entirety by reference.

The present invention relates to fire retardant coating compositions, their preparation and use.

Coating compositions are commonly used to coat the surfaces found in buildings, for example walls, ceilings, floors and furniture. Such surfaces are usually coated at ambient temperature of about 5 to 40° C. using brushes, rollers, pads or sprays. The coatings include paints, lacquers and varnishes. Such coatings can burn in the event of a fire in a building.

Fires inside buildings and other structures cause substantial damage and often loss of life both from the heat of the blaze as well as the smoke generated. A source of fuel in such fires is the coating on the surfaces found inside buildings. Of course, such surfaces are often repainted many times and, over the years, it is not uncommon to have ten or more coats of dried paint thereon. Such multiple coats of paint, although unlikely to be the initial source of the fire, will certainly feed it thereby prolonging its duration and increasing the damage caused. To be effective in real life situations, therefore, fire retardant coatings must be of low flammability themselves as well as sufficiently robust to maintain their integrity in a fire such that the paint layers and other substrates beneath are substantially prevented from igniting.

In order to make objective comparisons, a system of certification by national bodies has been set up. Such certifying bodies have developed various testing protocols to assess the effectiveness of the fire retardant coatings. These vary in severity by specifying different substrates, for example flammable versus non-flammable and whether or not the substrate is overcoated with previous dried layers of flammable paint. An example of the more severe test is BS 476 titled Fire Tests on Building Materials and Structures part 7, which describes the method of test to determine the classification of the surface spread of flames for products and which is herein incorporated by reference. The test method is available from the British Standards Institute in London and reference libraries.

The most challenging substrate for the test is the Warrington blue board which is plasterboard coated with 10 layers of different paints. This is then coated with a fire retardant coating, subjected to the test and the result assessed.

Known fire retardant coating compositions contain fire retardant materials. In addition, such coatings may also contain polymeric binder, particulate non-binder solids such as inorganic and/or organic pigments (for example rutile titanium dioxide) and/or extenders (for example clays or talc) as well as other optional ingredients such as structuring agents (for example laponite or bentonite clays), coalescing solvents (for example benzyl alcohol or white spirit), antifoaming agents and biocides.

The volume of particulate matter contained in a dry coating compared with the total volume of the dried coating (including film forming polymeric binder) is known as the pigment volume concentration or PVC and is normally expressed as a percentage. In this context the term pigment includes all matter which remains particulate in the final film. The concept of PVC also applies to polymeric moulding formulations. A general discussion of PVC can be found in Paint and Surface Coatings Edited by R. Lambourne and published in 1987 by Ellis Horwood, at page 364, the contents of which page are herein incorporated by reference.

Typical of the fire retardant materials referred to above include organic halogen compounds such as chlorinated paraffins and brominated materials. Chlorinated polymers and copolymers such as polyvinyl chloride and polyvinyledene chloride are themselves fire retardant by virtue of their high chlorine content. The halogenated materials may be used alone or together with antimony compounds such as antimony trioxide or antimony pentoxide which are thought to act as synergists. One proposed mechanism for the mode of action of the halogenated and mixed antimony-halogenated systems is that they interfere with the mechanism responsible for producing high energy radicals in the gas phase of the flame thereby reducing the magnitude of the flame and/or its temperature. Such agents are effective but they tend to produce high smoke density and corrosive gases in the fire causing more damage. Furthermore, handling antimony compounds and halogenated materials during the paint-making process is itself a cause of concern for the health and safety of the workers involved. Dust produced by sanding flame retardant paint containing antimony creates an additional hazard for the environment.

Alternatives to the halogen fire retardants include a class of compounds that produce water vapour or carbon dioxide at elevated temperature. Examples of such materials are the metal carbonates such as Huntite ($3MgCO_3xCaCO_3$) and Hydromagnesite ($Mg_5(CO_3)_4(OH)_2x4H_2O$) and metal hydroxides, such as aluminium trihydroxide also known as aluminium trihydrate; and magnesium hydroxide. These are also sometimes referred to as fire retardant fillers. In the early stages of the fire such filler materials are believed to release the carbon dioxide or water thereby preventing flames taking hold or extinguishing any flames that have already taken hold. However, a known disadvantage is that they are not very effective at high temperature.

At higher temperatures, materials capable of producing glass-like chars can be more effective. Zinc borate is an example of such a material. The chars thus formed are thought to act as a physical barrier blocking heat reaching the substrate beneath the painted surface. Unfortunately, such glassy chars are very brittle and have a tendency to fall off the very article they are intended to protect. More recently mixtures of glass-like materials and ceramic-like materials have become available and these produce glassy chars that are more robust.

In addition to these are the coatings producing fire retardancy by intumescence, by which is meant an insulating foam is produced at the temperatures found in a fire. Typically, an acid source, a charring source and a foaming agent are required. The acid source is a phosphorus compound generating phosphoric acid at high temperature. The charring source may be any source of carbon; the polymer of the film forming resin can be sufficient. The blowing agent is typically urea producing ammonia at high temperature. However, intumescent coatings often have poor decorative properties and overcoating them with conventional, that is non-fire retardant, coatings generally creates problems of wetting which can result in an unattractive final appearance.

EP 0 833 862 discloses a process for coating inorganic filler particles such as magnesium hydroxide or aluminium trihydroxide with certain tin compounds. The use of such coated filler particles as fire retardants in low PVC (in particular less than 15%) polymer moulding formulations is also disclosed. These moulding formulations, however also contain halogenated materials such as polyvinyl chloride as the polymeric binder or Cerechlor 70, a chlorinated paraffin wax, which are themselves known to be effective as fire retardants due to their high chlorine content as discussed above. Of course the presence of the chlorine produces dense smoke and corrosive gases during combustion.

EP 0 833 862 also mentions coating compositions although specific formulations are not revealed and high PVC, halogen free coatings are not disclosed.

Surprisingly, we have now found that halogen-free coating compositions can be made at very high PVC and of improved fire retardant properties.

Accordingly, there is provided a halogen-free fire retardant coating composition comprising film forming polymer and inorganic fire retardant material characterised in that the fire retardant material comprises a combination of fire retardant filler particles and a metal stannate and/or a metal hydroxy stannate wherein the overall PVC of the composition is from 75 to 97%.

By halogen-free is meant that the coating composition is substantially free of halogen containing fire retardant materials.

Preferably the fire retardant material of the coating composition is able to give off water and/or carbon dioxide when the dried coating is exposed to the elevated temperatures found in or close to a flame in a fire. More preferably the fire retardant filler is selected from the group consisting of huntite, hydromagnesite, aluminium trihydroxide and magnesium hydroxide.

The metal stannates may be represented by $MSnO_3$ and the metal hydroxy stannates by $MSn(OH)_6$. Preferably the metal represented by M is zinc, magnesium, calcium, strontium, barium, iron, cobalt, nickel or copper. Preferably the metal is zinc as this produces effective fire retardancy as well as being substantially colourless. Even more preferably the metal hydroxy stannate is zinc hydroxy stannate.

Suitable combinations of filler particles and metal stannates and/or metal hydroxy stannates include mixtures of the filler particles and the stannate(s). These may be added to the coating composition pre-mixed or seperately. Preferably the fire retardant material comprises the fire retardant filler particles coated with the metal stannate and/or the metal hydroxy stannate as this produces more effective fire retardancy. More preferably, the coating is bound to the filler particles. A suitable example of a fire retardant filler coated with a metal hydroxy stannate is aluminium trihydrate coated with zinc hydroxy stannate, available as Storflam ZAH™.

Preferably the fire retardant material comprises from 100 to 2000% and more preferably from 300 to 1500% by weight of the film forming polymer. Most preferably, the fire retardant material comprises from 900 to 1400% as this produces the optimum balance of fire retardancy and other dried coating properties.

Preferably the PVC is from 80 to 97%, more preferably from 85 to 95% and even more preferably from 87 to 93%. Preferably at least 65% of the PVC of the composition is provided by the fire retardant material.

Although not wishing to be bound by this theory, the very high PVC of the coatings of the invention not only allows very high levels of fire retardant materials to be incorporated into the dried coating, it also results in a minimum amount of film forming polymer in the coating. As it is the film forming polymer that is the main flammable material, fire retardancy is thereby further improved.

Formulating at such high PVC can reduce some of the desirable properties of the coating composition. In particular, there is a tendency for the wet coating to form fissures as it dries creating a dried, solid coating with cracks in it. This not only produces an undesirable appearance but, of course, reduces the fire retardant properties of the coating resulting from the exposure of the flammable material beneath to flames and heat.

Large particle size materials may be used to overcome this problem. By large in this context is meant that the particle size distribution extends from sub-micron up to 1000 microns, preferably from 0.1 to 750 microns, more preferably from 0.1 to 500 microns and still more preferably from 0.1 to 200 microns. Where the particles are substantially spherical the size refers to the diameter. Where the particles are non-spherical the size refers to the largest dimension.

Most preferred are particle size distributions where 50 to 90% by weight of the particles are up to 50 microns and from 5 to 25% by weight are greater than 50 to 100 microns and from 5 to 25% by weight are greater than 100 to 200 microns. Particles above about 200 microns can produce a textured effect in the dried coating so where a smooth final appearance is required the particle size distribution is preferably substantially free of particles greater than 250 microns.

The particles are preferably substantially spherical as coatings containing them are smoother and more robust. However, some particles with a high aspect ratio, such as fibres, may bend and coil during drying. The resultant dried coatings can thus contain fibres of up to about 3 mm in length without exhibiting significant texture in the dried coating. These may be selected by routine experiment.

Although the size and distribution of the particles largely determines their effectiveness in preventing the cracks and other defects from forming, the type of the material itself will affect the fire retardancy of the coating composition. Preferably non-flammable materials are used. More preferably, inorganic materials are used.

Suitable examples of such non-flammable materials include fly ash, calcium carbonate, clays, talc and glass fibres or spheres. Fly ash comprises hollow alumina-silicate spheres extracted from pulverised fuel ash. Fillite™ 200/7 is a suitable example of the fly ash type. Examples of suitable glass fibres are available from Wrigley Fibres, F.H.Wrigley Ltd in Somerset, England TA4 4RF under the tradename PAN™ fibres or from Fibertec Inc, Bridgewater, Mich., USA 023204 under the tradename Microglass™. Suitable examples of hollow glass spheres are available from Wrigley Fibres as glass micro balloons. A suitable example of calcium carbonate is Durcal 130.

Preferably, such materials comprise from 5 to 40% by weight of the coating formulation, more preferably from 10 to 30% by weight of the coating formulation and even more preferably from 15 to 25% by weight of the coating formulation.

Preferably the coating composition contains at least one component selected from the group consisting of pigments, rheological modifiers, flow aids, dispersants, extenders, antifoams, crosslinking agents and biocides.

Preferably the coating composition is waterborne as this reduces the amount of organic solvent released to the atmosphere during drying of the applied coating. Such solvents in the atmosphere are considered hazardous to the environment and in many cases the users of the paint dislike the odour they produce. By waterborne is meant that at least 50% by weight of the volatile material or the carrier liquid of the coating composition is water. More preferably the organic solvent level is from 0.1 to 30% and even more preferably from 0.5 to 10% by weight of the total paint composition. Most preferably the coating composition is substantially free of organic solvent. Preferably, where organic solvents are used, for example to improve substrate wetting or dispersion of the particulate matter, water compatible or water-soluble solvents are used. Examples of such suitable solvents include propylene glycol, benzyl alcohol, ester alcohols such as Texanol and paraffinic solvents such as Exxsol D40 and white spirit.

Organic solvents, preferably water compatible organic solvents are also useful in increasing the open time of the coating; that is they extend the time it takes for the coating composition to dry. This is especially important for coatings formulated at PVC above about 75% as they have a tendency to form defects during drying.

It is preferred that the coating composition is 1 pack. By this is meant that the liquid coating composition may be used direct from the container. Furthermore, other than perhaps reducing the viscosity by the addition of solvent, say water, no further essential ingredients are required to be mixed in order for the coating to develop its intended properties as a fire retardant coating. Such a ready for use coating composition has the additional advantage that it does not have a limited 'pot life' beyond which any unused coating must be discarded.

Suitable film forming resins include addition polymers and condensation polymers. The term polymer is used herein to describe both homopolymers and copolymers.

Suitable examples of addition polymers can be derived from acrylic acid esters and methacrylic acid esters, amides, nitriles, vinyl monomers such as styrene and its derivatives and vinyl esters such as vinyl acetate and vinyl versatate.

Using the nomenclature (meth)acrylate to represent both acrylate and methacrylate, suitable (meth)acrylic acid esters include the alkyl esters, preferably methyl (meth)acrylate, propyl (meth)acrylate, butyl (meth)acrylate, 2-ethyl hexyl (meth)acrylate and alkoxy poly(oxyethylene) (meth)acrylate. Small amounts of acrylic acid and/or methacrylic acid may also be used. Hydroxy functional monomers such as hydroxy ethyl (meth)acrylate and/or hydroxy isopropyl (meth)acrylate, may also be included. Preferably the addition polymer is derived from the esters of (meth)acrylic acid. More preferably the addition polymer is derived from methyl methacrylate, 2-ethyl hexyl acrylate and acrylic acid and even more preferred is where the weight ratio of these monomers is 50.5:48.5:1.0. respectively.

Suitable examples of condensation polymers include polyesters and polyurethanes. Urethane-acrylic hybrid polymers, where the urethane and acrylic addition polymer portion are closely associated may also be used.

The glass transition temperature, or Tg of the addition polymer may be varied by copolymerising monomers of appropriate Tg. Similarly, by varying the amount of hard and soft coreactants the Tg of the condensation polymers may also be varied. In this way polymers which are hard, soft or intermediate Tg can be made which can produce a range of desirable physical properties, such as hardness in the dried coating.

Preferably Tg of the polymer used as the film forming resin is from −60° C. to 130° C., more preferably from −50° C. to 70° C. and even more preferably from −30 to 30° C. The lower Tg polymers are preferred as they allow a coherent dried coating to form even at very high PVC.

The film forming resin may be a solution polymer by which is meant that the polymer is dissolved in organic solvent or water; or a dispersion polymer where the polymer exists as particles dispersed in a liquid carrier medium. Such dispersions are often referred to as latexes. Preferably the film forming resin is a dispersion polymer and more preferably the liquid carrier medium is substantially water. The weight average particle diameter of such latexes is preferably from 0.01 to 5 microns, more preferably from 0.1 to 3 microns and most preferably for 0.1 to 1 microns.

Preferably they are made by emulsion polymerisation process.

The wet coating should be applied to the substrate at a thickness sufficient to produce a dried coating thickness of from 0.3 to 3.0 mm, preferably from 0.5 to 2.0 mm and most preferably from 0.8 to 1.25 mm. At higher dried coating thickness, for example greater than 0.5 mm, more than one coat may be required. Preferably, dried coating thickness of 2 mm can be achieved in 2 or 3 coats. This can be achieved by brush or roller application although roller application is preferred.

In order to achieve such coating thicknesses the medium shear viscosity should be, preferably from 0.6 to 6.0 Pa·s, more preferably from 1.0 to 5.0 Pa·s and even more preferably from 1.0 to 4.0 Pa·s. The viscosity is measured at 25° C. using a Rotothinner viscometer (available from Sheen Instruments, Teddington, London, England) fitted with a 1.25 inch (3.175 cm) spherical bob (part number 455N/65) rotating at 562 rpm.

Other important paint properties are also affected by the very high PVC of the invention. For example, stain resistance and scrub resistance may be unacceptably poor. In these circumstances the dried layer of fire retardant coating composition may be overcoated with a second different layer of conventional coating which, although is itself not fire retardant to the extent of the coating compositions provided by this invention, nevertheless does have acceptable stain and scrub properties. Surprisingly, such a system has good fire retardant properties.

Accordingly, there is provided a fire retardant coating system, comprising a first dried layer of fire retardant coating composition and a second dried layer of coating composition characterised in that the second layer is of a different composition. Preferably the second layer is coloured and containing pigments in addition to titanium dioxide.

Such a two product system has the added advantage that a fire retardant system can be produced offering a range of colours without the need to formulate a range of coloured compositions which are themselves fire retardant. Optionally, the second coating layer is fire retardant.

In cases where the adhesion between the fire retardant coating composition and the substrate is poor or inadequate, it is preferred that the coating system comprises a layer of primer, between the substrate and the fire retardant coating in order to increase the adhesion to acceptable levels. Such primers are often referred to as adhesion promoting primers. The primer may itself be fire retardant.

The invention also provides a method of forming a coated substrate comprising providing a substrate and applying onto at least a portion of the substrate at least one layer of a coating composition of the invention and allowing the layer to dry.

The invention further provides a coated substrate comprising a substrate, such as for example a wall, ceiling, floor or article, coated with a coating composition of the invention.

The invention is further illustrated by the following examples.

The ingredients referred to in the examples are listed below and are available from the suppliers listed.

Bentone™ EW, a clay thickener is available form Elementis, Stolbergerstrasse 370, Cologne, Germany.

Dispelair™ CF246, an antifoam is available from Blackburn Chemicals Ltd at Whitebirk Industrial Estate, Blackburn, England, BB1 5SX Acticide™ CHR 0107, a biocide is available from Thor at Wincham Avenue, Wincham, Northwich, Cheshire, England, CW9 6GB Orotan™ 731 and Acrysol SCT-275, a dispersant and thickener respectively are available from Rohm & Haas at Lennig House, 2, Masons's Avenue, Croydon, Surrey, England, CR9 3NB Propylene Glycol is available from Petrochem Carless at Cedar Court, Guildford Road, Leatherhead, Surrey, England, KT22 9RX Disponil™ A1580, a dispersant is available from Cognis at 40551 Dusseldorf, Germany Storflam™ ZAH and Storflam ZHS are available from Joseph Storey & Co Ltd at Heron Chemical Works, Moor Lane, Lancaster, England, LA1 1QQ Natrosol™ 250 MR and Aquaflow™ NHS 300, both thickeners, are available from Hercules BV Aqualon Division, at Noordweg 9, PO Box 71, 3330 AB Zwijndrecht, The Netherlands Fillite™ 200/7 is available from Fillite at Goddard Road, Astmoor Industrial Estate, Runcorn, Cheshire, England Microglass™ 3004, glass fibres is available from Fibertec Inc at 35, Scotland Boulevard, Bridgewater, Mass. 02324, USA Warrington Blue Boards are available from Warrington Fire Research Centre, Holmesfield Road, Warrington, Wa1 2DS, England DULUX™ Trade Vinyl Matt White is available from Imperial Chemical Industries, Wexham Road, Slough, Berkshire, SL2 5DS, England Blanose 7M 31C SCS 9554 is a cellulosic thickener available from Aqualon, 9, Noordweg, 3336 LH Zwijndrecht, Holland Exxsol D40 is available from Exxon-Mobil, 4600 Parkway, PO Box 122, Fareham, Hampshire, PO15 7AP, England Texanol is available from Eastman Chemical, Charlottenstrasse 61, D 51149 Koln, Germany China clay D and China Clay Supreme are both extenders and are available from Imerys, John Keay House, St Austell, PL25 4DJ, England.

Tioxide TR92 is titanium dioxide pigment is available from Huntsman Tioxide, Tees Road, Hartlepool, TS25 2DD, England Securoc A32 is aluminium trihydroxide and is available from Incemin, Schachen 82, Holderbank, CH-5113, Switzerland Microdol H200 is a dolomite extender is available from OMYA, Curtis Road, Dorking, Surrey, RH4 1 XA, England Durcal 130 is calcium carbonate in the form of large particles and is available from Omya.

EXAMPLES

Example 1

To a 2.5 liter container (diameter 150 mm) fitted with a dispersion impeller blade of 100 mm diameter is added the first portion 564.6 g of Tap Water (1) and 23.2 g of Bentonem™ EW whilst stirring at 500 to 1000 rpm. Stirring is continued for about 5 minutes until a uniform dispersion is formed with no obvious signs of agglomeration. To this mixture is added, whilst stirring and in the order indicated in Table 1, the ingredients of Portion B in the amounts shown. Storflam™ ZAH is added slowly over a period of about 3 minutes. When all of the ingredients are added to the container, the resulting mixture of Portion A and Portion B are dispersed using high speed stirring at 2000 to 3000 rpm for about fifteen minutes to form the millbase. The ingredients of Portion C are then added in the order indicated in Table 1 with slow speed stirring of about 350 rpm using a Heidolph stirrer fitted with a 100 mm diameter paddle blade until a uniform consistency is achieved to form the final coating composition.

TABLE 1

|  | Wt % | g |
|---|---|---|
| Portion A | | |
| Tap water (1) | 18.435 | 564.6 |
| Bentone EW | 0.759 | 23.2 |
| Portion B | | |
| Dispelair CF246 | 0.205 | 6.3 |
| Acticide CHR 0107 | 0.198 | 5.8 |
| Orotan 731 (25%) | 1.230 | 37.7 |
| Propylene Glycol | 2.374 | 72.7 |
| Disponil A1580 | 0.205 | 6.3 |
| Storflam ZAH | 42.73 | 1308.7 |
| Natrosol 250MR | 0.040 | 1.2 |
| Tap Water (2) | 2.612 | 80.0 |
| Portion C | | |
| Fillite 200/7 | 21.093 | 646.0 |
| Acrylic polymer latex* | 5.822 | 178.3 |
| Acrysol SCT-275 | 0.957 | 29.3 |
| Microglass 3004 | 2.391 | 73.2 |
| Aquaflow NHS 300 | 0.096 | 29.3 |

*The acrylic polymer latex is made by an emulsion polymerisation process and has a monomer composition of methyl methacrylate/2-ethyl hexyl acrylate/acrylic acid of weight ratio 50.5/48.5/1.0 respectively with a calculated Tg of 6.4° C. The solids content is 50% by weight.

The non volatile content of the coating is 71% by weight.
The calculated PVC of Example 1 is 95%
The Rotothinner viscosity measured at 25° C. was 3 Pa·s.

Comparative Example A

Dulux Trade White Vinyl Matt paint was used as the comparative example.

The Rotothinner viscosity measured at 25° C. was 0.83 Pa·s.

Test Method

A Warrington Blue Board supplied by the manufacturer pre-coated with 10 layers of paint. The specimen board is prepared by applying the test coating to the Warrington Blue board and allowing it to dry and age for 3 days.

This specimen board is tested according to BS 476 part 7, a summary of which is detailed below.

The specimen is mounted in a water-cooled holder and is exposed to a radiant panel for 10 minutes. In addition a pilot flame is applied to the bottom corner of the specimen during the first minute of the test. The time required for the flame front to reach reference marks on the specimen is noted, together with the extent of the flame spread at 1.5 minutes and 10 minutes after the beginning of the test.

Testing

Preparation of Specimen 1

The fire retardant coating composition of Example 1 was applied to the prepared aged Warrington Blue board in three coats using a medium length pile (about 12 mm) roller and allowed to dry. Each coat was allowed to dry overnight before the next coat was applied. A dried coating thickness of 1100 microns (1.1 mm) was achieved. This was allowed to age for 3 days before being submitted to the BS 476 part 7 test to assess fire retardancy. After 1.5 minutes the flame had spread 40 mm and after 10 minutes had spread 50 mm from the reference point.

Preparation of Specimen 2

The coating composition of Example 1 was applied to Warrington Blue board using the same method as for Specimen 1. This was further coated with the coating composition of Comparative Example A, in two coats. The dried coating thickness achieved was 1100 microns and 80 microns respectively. This was allowed to dry and age for 3 days before testing according to BS 476 part 7 to assess fire retardancy. After 1.5 minutes the flame had spread 40 mm and after 10 minutes had spread 50 mm from the reference point.

Preparation of Specimen A

Dulux Trade Vinyl Matt of Comparative Example A was applied to the prepared aged Warrington Blue board using the same method as used in the preparation of Specimen 1 except that 7 coats of the wet coating composition were required to achieve a dried coating thickness of 150 microns was achieved. This was allowed to dry and age for 3 days before testing according to BS 476 part 7 to assess fire retardancy. After 1.5 minutes the flame had spread 300 mm and after 10 minutes had spread 440 mm from the reference point.

The spread of the flame when using the coating compositions of the invention is shown to be significantly reduced whether the specimen is coated with conventional, non fire retardant paint or not.

Further Examples

Examples 2, 3 and 4

Examples 2, 3 and 4 were made according to the same process as described in Example 1 but using the ingredients and quantities indicated in Table 2.

Example 2 and 4 used Storflam ZAH (aluminium trihydroxide coated with zinc hydroxy stannate) as the fire retardant material and Example 3 used Securoc A32 (aluminium trihydroxide) and Storflam ZHS (zinc hydroxy stannate) in combination.

TABLE 2

|  | Example 2 wt/g | Example 3 wt/g | Example 4 wt/g |
| --- | --- | --- | --- |
| Portion A | | | |
| Tap water (1) | 451.4 | 451.4 | 531.7 |
| Bentone EW | 22.5 | 22.5 | 0 |
| Portion B | | | |
| Dispelair CF246 | 7.7 | 7.7 | 9.2 |
| Acticide CHR 0107 | 6.1 | 6.1 | 6.7 |
| Orotan 731 (25%) | 30.6 | 30.6 | 55.1 |
| Propylene Glycol | 70.4 | 70.4 | 0 |
| Exxsol D40 | 0 | 0 | 44.8 |
| Texanol | 0 | 0 | 29.9 |
| Disponil A1580 | 6.4 | 6.4 | 15.3 |
| China clay D | 0 | 0 | 211.3 |
| Tioxide TR92 | 0 | 0 | 229.7 |
| China clay Supreme | 0 | 0 | 268.9 |
| Storflam ZAH | 1313.1 | 0 | 667.6 |
| Storflam ZHS | 0 | 131.3 | 0 |
| Securoc A32 | 0 | 1181.8 | 0 |
| Microdol H200 | 284.6 | 284.6 | 0 |
| Tap Water (2) | 276.3 | 276.3 | 615.9 |
| Blanose 7M31C SCS 9554 | 4.7 | 4.7 | 17.9 |

TABLE 2-continued

|  | Example 2 wt/g | Example 3 wt/g | Example 4 wt/g |
| --- | --- | --- | --- |
| Portion C | | | |
| Acrylic polymer latex* | 172.2 | 172.2 | 358.5 |
| Primal ASE 60 | 6.1 | 6.1 | 0 |
| Durcal 130 | 410.5 | 410.5 | 0 |

*The acrylic polymer latex is the same as used in Example 1.

The non volatile content of the coating compositions of Examples 2 and 3 was 70% by weight and of Example 4 was 53% by weight.

The calculated PVC of Examples 2 and 3 was 91% and of Example 4 was 75%.

The Rotothinner viscosity of the coating compositions of Examples 2 and 3 measured at 25° C. were 1.7 Pa·s and 1.2 Pa·s respectively and of Example 4 was 0.6 Pa·s.

Further Testing

Preparation of Specimen 3

The coating composition of Example 2 was applied to Warrington Blue board using the same method as described in the preparation of Specimen 1. This was allowed to dry overnight and then one coat of the coating composition of Example 4 was applied. Dried coatings of thickness 1122 microns and 80 microns respectively were achieved. Specimen 3 was allowed to age for 3 days before testing according to BS 476 part 7 to assess fire retardancy. After 1.5 minutes the flame had spread 30 mm and after 10 minutes had spread 30 mm from the reference point.

Preparation of Specimen 4

The same procedure was followed as for the preparation of Specimen 3 except that the composition of Example 2 was replaced with the composition of Example 3. The dried film thickness achieved for compositions of each of Examples 3 and 4 were 1122 and 80 microns respectively. Fire retardancy was assessed according to BS 476 part 7. After 1.5 minutes the fire had spread 30 mm and after 10 minutes had spread 30 mm from the reference point.

What is claimed is:

1. A halogen-free fire retardant coating composition comprising:
   i) film forming polymer
   ii) inorganic fire retardant material
   characterised in that the fire retardant material comprises a combination of fire retardant filler particles and a metal stannate, a metal hydroxy stannate or a combination thereof, wherein the overall PVC of the composition is from 75 to 97% and the composition has a medium shear viscosity measured at 25° C. of from 0.6 Pa·s to 6.0 Pa·s.

2. A fire retardant coating composition according to claim 1 characterised in that the fire retardant material comprises fire retardant filler particles coated with the metal stannate, or the metal hydroxy stannate, or a combination thereof.

3. A fire retardant coating composition according to claim 1 characterised in that the inorganic fire retardant material is able to give off water, carbon dioxide or a combination thereof when in the form of a dried coating and exposed to the elevated temperatures found in or close to a flame in a fire.

4. A fire retardant coating composition according to claim 2 characterised in that the inorganic fire retardant material is able to give off water, or carbon dioxide, or combination thereof when in the form of a dried coating and exposed to the elevated temperatures found in or close to a flame in a fire.

5. A fire retardant coating composition according to claim 1 characterised in that the fire retardant filler is selected from the group consisting of huntite, hydromagnesite, aluminium trihydroxide and magnesium hydroxide.

6. A fire retardant coating composition according to claim 1 characterised in that metal hydroxy stannate is zinc hydroxy stannate.

7. A fire retardant coating composition according to claim 1 characterised in that the fire retardant material comprises from 100 to 2000% by weight of the film forming polymer.

8. A fire retardant coating composition according to claim 1 characterised in that the composition also contains at least one component selected from the group consisting of pigments, rheological modifiers, flow aids, dispersants, extenders, anti-foams, crosslinking agents and biocides.

9. A fire retardant coating composition according to claim 1 characterised in that the composition is waterborne.

10. A fire retardant coating composition according to claim 1 characterised in that the particles in the composition are substantially spherical particles up to 1000 microns in diameter.

11. A fire retardant coating composition according to claim 1 characterised as present on a substrate.

12. A fire retardant coating composition according to claim 1 characterised as present as a first dried layer of a fire retardant coating system having a second dried layer over the first dried layer where the second dried layer is of a different composition to the first.

13. A fire retardant coating composition according to claim 1 characterised as having at least two of:
  i) a fire retardant filler selected from the group consisting of huntite, hydromagnesite, aluminium trihydroxide and magnesium hydroxide;
  ii) a metal hydroxy stannate that is zinc hydroxy stannate;
  iii) a fire retardant material comprising from 100 to 2000% by weight of the film forming polymer;
  iv) at least one component selected from the group consisting of pigments, rheological modifiers, flow aids, dispersants, extenders, anti-foams, crosslinking agents and biocides;
  v) a medium shear viscosity measured at 25° C. from 0.6 pa·s to 6.0 Pa·s;
  vi) a composition that is waterborne; or
  vi) the particles present a substantially spherical particles up to 1000 microns in diameter.

14. A fire retardant coating composition according to claim 13 present on a substrate.

15. A fire retardant coating composition according to claim 14 characterised in that the fire retardant coating composition present on the substrate is as a first dried layer of a fire retardant coating system having a second dried layer over the first dried layer where the second dried layer is of a different composition to the first dried layer.

16. A fire retardant coating composition according to claim 1 characterised in that the fire retardant coating composition is prepared by:
  a) forming a uniform dispersion by combining water and a clay thickener,
  b) adding to the dispersion:
    i) an antifoam;
    ii) a biocide;
    iii) a first dispersant;
    iv) fire retardant material selected from 1) aluminium trihydroxide coated with zinc hydroxy stannate added over a period of about 3 minutes and 2) aluminium trihydroxide and zinc hydroxy stannate)
    v) a thickener; and
    vi) water; to form a mixture; and
  c) dispersing the mixture to form the millbase;
  d) adding to the millbase:
    i) fly ash having hollow alumina-silicate spheres;
    ii) acrylic polymer latex made by an emulsion polymerization process having a monomer composition of methyl methacrylate/2-ethyl hexyl acrylate/acrylic acid of weight ratio 50.5/48.5/1.0, respectively, with a calculated Tg of 6.4° C. and solids content of 50% by weight;
    iii) a thickener different from the first thickener,
    iv) glass fibers or calcium carbonate; and
    v) a third thickener to form the coating composition.

17. A method of forming a coated substrate comprising:
  a) providing a substrate
  b) applying onto at least a portion of the substrate at least one layer of a coating composition comprising:
    a halogen-free fire retardant coating composition comprised of:
    i) film forming polymer
    ii) inorganic fire retardant material
      characterised in that the fire retardant material comprises a combination of fire retardant filler particles and a metal stannate, a metal hydroxy stannate or a combination thereof, wherein the overall PVC of the composition is from 75 to 97%; and
  c) allowing the least one layer to dry.

* * * * *